United States Patent [19]

Higashino

[11] Patent Number: 4,908,756

[45] Date of Patent: Mar. 13, 1990

[54] DETECTING APPARATUS FOR ABNORMALITY IN INVERTER CIRCUIT

[75] Inventor: Shigenori Higashino, Hyogo, Japan

[73] Assignee: Mitsubishi Denki Kabushiki Kaisha, Tokyo, Japan

[21] Appl. No.: 179,260

[22] Filed: Apr. 8, 1988

[30] Foreign Application Priority Data

Apr. 10, 1987 [JP] Japan .................................. 62-89556

[51] Int. Cl.⁴ ............................................. H02H 7/122
[52] U.S. Cl. ........................................ 363/58; 363/98; 363/138
[58] Field of Search .................... 363/56, 57, 58, 96, 363/97, 98, 132, 135, 136, 137, 138; 361/79, 86, 87, 88, 90, 91

[56] References Cited

U.S. PATENT DOCUMENTS

| 4,068,294 | 1/1978 | Anderson et al. | 363/58 |
| 4,161,010 | 7/1979 | Mann et al. | 363/138 |
| 4,183,081 | 1/1980 | Cutler et al. | 363/138 |
| 4,238,821 | 12/1980 | Walker | 363/58 |
| 4,263,646 | 4/1981 | Beatty | 363/58 |
| 4,546,422 | 10/1985 | Okado | 363/98 |

FOREIGN PATENT DOCUMENTS 53-88121 8/1978 Japan .

Primary Examiner—Peter S. Wong
Attorney, Agent, or Firm—Bernard, Rothwell & Brown

[57] ABSTRACT

A detecting apparatus for abnormality in an inverter circuit comprising an inverter circuit for converting electric power in a DC circuit into that in an AC circuit and vice versa based on a command signal for commutation, a detecting circuit for commutation in a main circuit, the detecting circuit being composed of a current detecting circuit provided between a voltage dividing point of the DC circuit and the inverter circuit and provided with its one end connected to the voltage dividing point and a differentiating circuit connected between the other end of the current detecting circuit and the AC terminal of the inverter circuit, and, a logic circuit for judgement of abnormality in commutation, the logic circuit comparing a detected signal of the detecting circuit for commutation in the main circuit with a command signal for commutation for commanding its commutation for the inverter circuit, and, at the same time, detecting inconsistency in logics of the detecting signal and command signal for commutation within an arbitrary time period, and constituted so as to detect abnormality in commutation in the main circuit by inconsistency based on coincidence or disagreement of logic signals output by logic operation in the logic circuit.

6 Claims, 6 Drawing Sheets

DETECTING APPARATUS FOR ABNORMALITY IN INVERTER CIRCUIT

BACKGROUND OF THE INVENTION

1. Field of the Invention

This invention relates to a detecting apparatus for abnormality in an inverter circuit which detects abnormality in operation of an apparatus which performs conversion of electric power by using inverters such as no-break power units.

2. Description of the Prior Art

FIG. 1 is a circuit diagram showing an example of a conventional detecting apparatus for abnormality in an inverter shown in, for example, Japanese Patent Laid-open No. 53-88121 (1978). In FIG. 1, a numeral 1 shows a three-phase auxiliary pulse commutating inverter circuit, a numeral 2 a DC power source, a numeral 3 a high speed breaker, a numeral 4 a current limiting reactor, a numeral 5 a balanced capacitor, a numeral 6 an auxiliary thyristor arm, a numeral 7 an insulating transformer, a numeral 8 a rectifier, a numeral 9 a transistor, numerals 10 and 11 are NOT circuits, a numeral 12 is an exclusive OR circuit, a numeral 13 a monostable multivibrator, and a numeral 14 a commutation detecting circuit. FIG. 2 is a time chart explanatory of operation of the conventional example.

Next, the operation of the conventional example will be described.

When the three-phase auxiliary pulse commutating inverter circuit 1 operates normally, a pulse voltage appears with a commutation period at the output of the insulating transformer 7 connected between the center of capacitors 5A and 5B composing the balanced capacitor 5 and that of auxiliary thyristor arms 6A and 6B composing the thyristor arm 6 of the inverter 1, the pulse voltage is input to the commutation detecting circuit 14 via the rectifier 8, and the input waveform becomes as shown in the period $T_1$ in FIG. 2(a). On the other hand, a command pulse waveform for commutation in the inverter as shown in the period $T_1$ in FIG. 2(b) is applied to the commutation detecting circuit 14 from a control circuit (not shown). A transistor 9 repeats on-off action depending upon an input from the insulating transformer 7 and obtains a waveform as shown in the period $T_1$ in FIG. 2(c) as a collector output. Furthermore, the waveform is inverted by the NOT circuit to obtain a waveform as shown in the period $T_1$ in FIG. 2(d) having the same phase as the command pulse waveform for commutation shown in the period $T_1$ in FIG. 2(b). The command pulse waveforms for commutation shown in FIG. 2(b) are input from the NOT circuit and the control circuit into the exclusive OR circuit 12, which outputs "0" outputs in succession at the logic at which both inputs are "0" or "1", and a waveform shown in the period $T_1$ in FIG. 2(e) is obtained. The monostable multivibrator 13 outputs "1" of the waveform shown in the period $T_1$ in FIG. 2(f) in succession, and "0" of a waveform shown in the period $T_1$ in FIG. 2(g) is obtained as an output of the NOT circuit 11. On the other hand, when commutation in the inverter becomes abnormal, a waveform "1" shown in the period $T_2$ in FIG. 2(g) is obtained as an output of the NOT circuit 11 as shown by the waveforms shown in the period $T_2$ in FIG. 2(a) through (g), thereby detecting abnormality.

Since a conventional detecting apparatus for abnormality in an inverter had such a constitution that the insulating transformer 7 was directly connected between the center of the capacitors 5A and 5B composing the balanced capacitor 5 and that of the auxiliary thyristor arms 6A and 6B composing the auxiliary thyristor arm 6, the insulating transformer 7 needed an iron core of sufficient size to have a capacity of magnetic flux in accordance with the commutation period and, in addition, iron cores of at least the same number as that of the auxiliary thyristor arms 6 were employed. There was, therefore, a problem that the whole of the inverter apparatus became large in size and heavy in weight. In addition, there was a problem that instability in operation because of erroneous detection of abnormality confirming operation and the like occurred due to delay in operation of switching elements in the main circuit and element driving circuits.

SUMMARY OF THE INVENTION

This invention is done in order to eliminate the above-mentioned problems, and its object is to provide a detecting apparatus for abnormality in an inverter in which a large-sized insulating transformer for detection is not needed, an apparatus of small size and light weight is achieved, and at the same time, instability in abnormality confirming operation due to delay in operation of switching elements in the main circuit and element driving circuits is prevented.

A detecting apparatus for abnormality in an inverter related to this invention uses a current detecting circuit and a differentiating circuit as a detecting circuit for commutation in a main circuit of an inverter, detects change in potential at an AC terminal caused at the time of commutation or abnormality of arc-through as a differentiated signal, compares presence or absence of the detecting signal with a command signal for commutation, and detects that the logics of the both signals are inconsistent with each other within a definite time limit, thereby detecting abnormality in commutating action of inverters with high reliability.

A detecting apparatus for abnormality in an inverter in this invention detects abnormality based on the following two logical judgements.

(1) The case where a logic which detects variation in potential at an AC terminal holds in the state in which a command signal for commutation is absent in the inverter circuit.

(2) The case where there holds a logic which detects that after sending the command signal for commutation to the inverter circuit, a detecting signal which indicates variation in potential at the AC terminal within a definite time limit does not occur.

Also, by providing the time limit in the above-mentioned term (2), instability in detecting action for abnormality caused by delays in switching elements in the main circuit and in element driving circuits is eliminated, carrying out stable abnormality detecting operation.

Furthermore, the detection of variation in potential at the AC terminal caused by commutation operation in the main circuit as a differential pulse signal permits a current detecting circuit giving electric insulation against the main circuit to be made small in size and light in weight, and the current detecting circuit to be used in common with a plurality of AC terminals.

DETAILED DESCRIPTION OF THE PREFERRED EMBODIMENT

Figure 1:
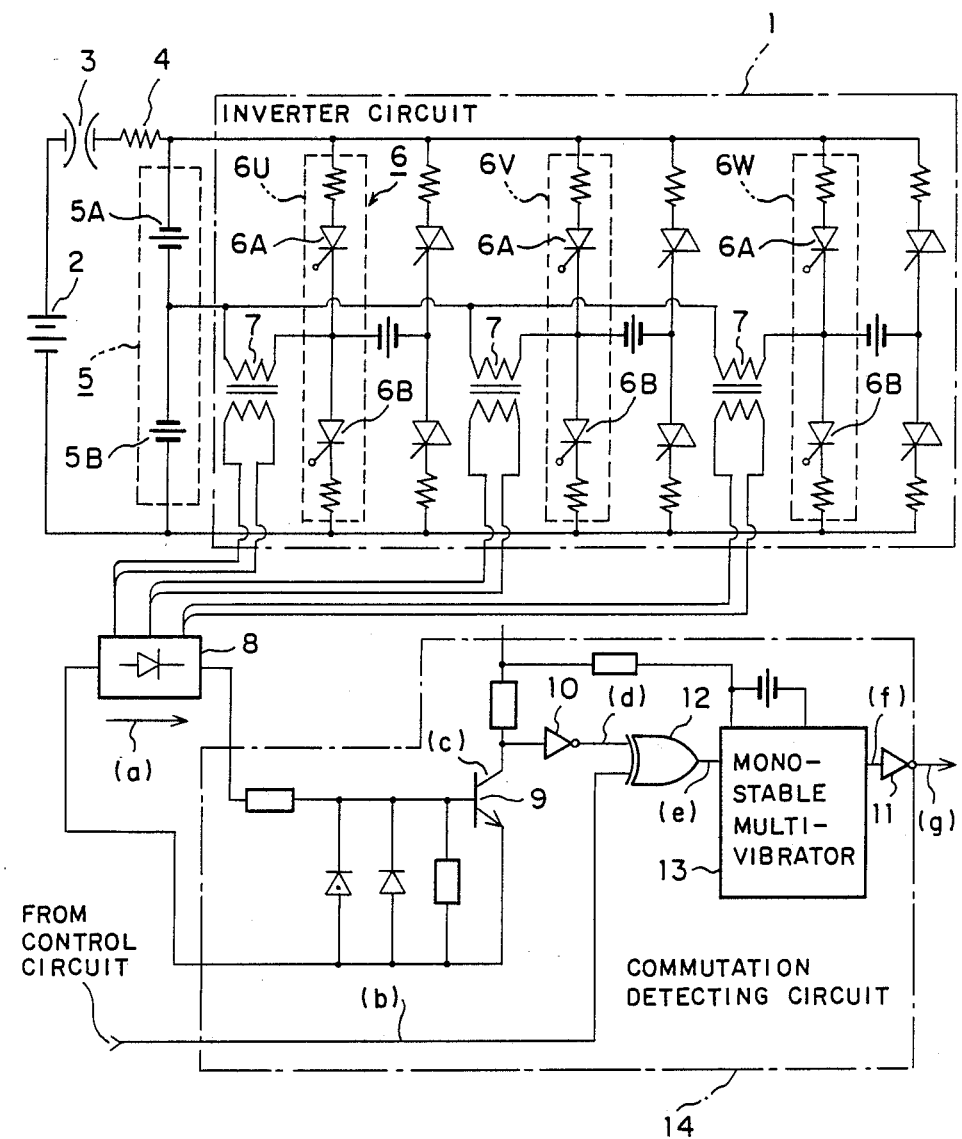
FIG. 1 is a circuit diagram showing an example of a detecting apparatus for abnormality in a conventional inverters.
Figure 2:
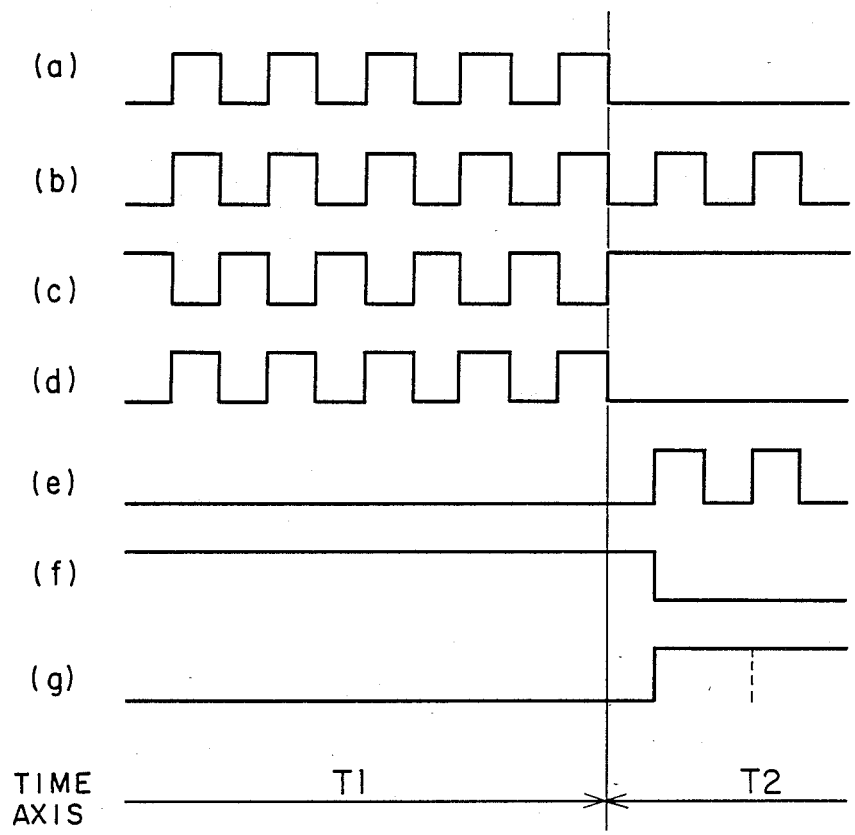
FIG. 2 is a time chart showing the operation of the detecting apparatus for abnormality in the conventional inverter shown in FIG. 1.
Figure 3:
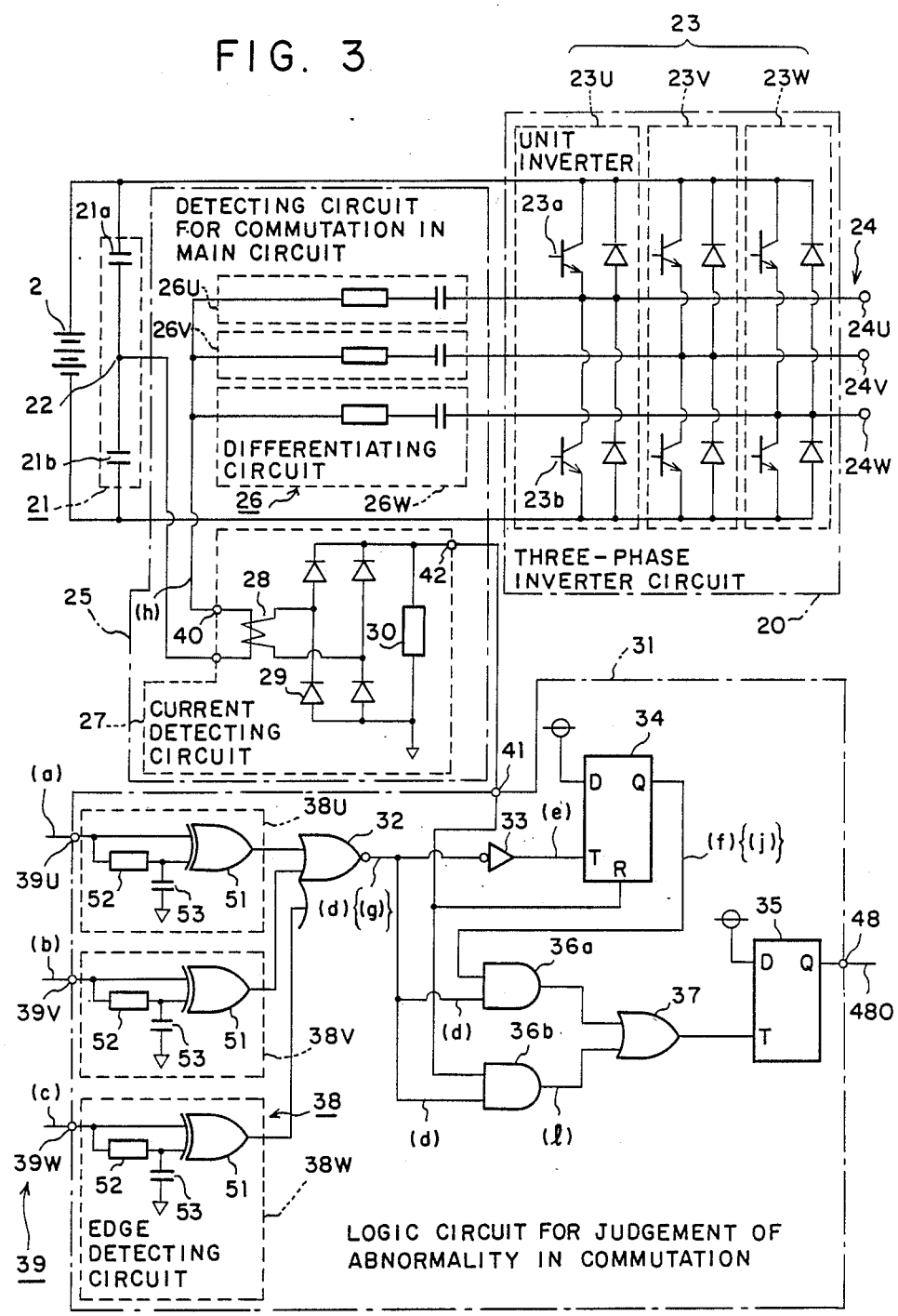
FIG. 3 is a circuit diagram showing a detecting apparatus for abnormality in the inverter of an embodiment according to this invention.

Hereinafter, an embodiment according to this invention will be described with reference to drawings. FIG. 3 is a circuit diagram showing one embodiment according to this invention. Components in FIG. 3 which are the same as those in FIG. 1 are identified by the with same numerals, and the description of them is omitted. In FIG. 3, numeral 20 is a three-phase transistor inverter circuit (hereinafter, it is called as a three-phase inverter circuit) and numeral 21 is a balanced capacitor having a voltage dividing point 22. Numerals 23U, 23V, and 23W are unit inverter circuits, and numerals 24U, 24V, and 24W are the centers of the unit inverter circuits 23U, 23V, and 23W, that is, an AC terminal 24 of the three-phase inverter circuit 20. A numeral 25 is a detecting circuit for commutation in the main circuit. The detecting circuit 25 for commutation in the main circuit is composed of a differentiating circuit 26 comprising a series circuit of a resistor and a capacitor and a current detecting circuit 27. The current detecting circuit 27 is composed of a transformer 28, a rectifier 29, and a current-voltage converting resistor 30. A numeral 31 is a logic circuit for judgment of abnormality in commutation, which comprises a NOR circuit 32, a NOT circuit 33, D flip-flops 34 and 35, AND circuits 36a and 36b, an OR circuit 37, and an edge detecting pulse generating circuit 38 composed of an exclusive OR circuit 51, a resistor 52, and a capacitor 53. A numeral 39 is an input terminal having several terminals 39U, 39V and 39W to which signals in synchronism with on-off command signals supplied to up and down arms 23a and 23b of the inverter circuits 23U, 23V, and 23W are input, respectively. The edge detecting pulse generating circuit 38 comprises individual edge detecting pulse generating circuits 38U, 38V and 38W having same structure and detecting each edge of the three-phase. The edge of the signal input to the input terminal 39 is detected as a pulse signal, and at the same time, input to the edge detecting circuit 38 which makes the time limit for inhibiting judgement of abnormality in commutation by the detecting circuit 25 for main circuit's commutation. A numeral 40 is one terminal of the current detecting circuit 27 to which the differentiating circuit 26 is connected, and a numeral 41 is an input terminal of the logic circuit for judgement of abnormality in commutation 31 to which the output terminal 42 of the current detecting circuit 27 is connected. A numeral 48 denotes an output terminal of the logic circuit for judgement of abnormality in commutation 31.

Figure 4:
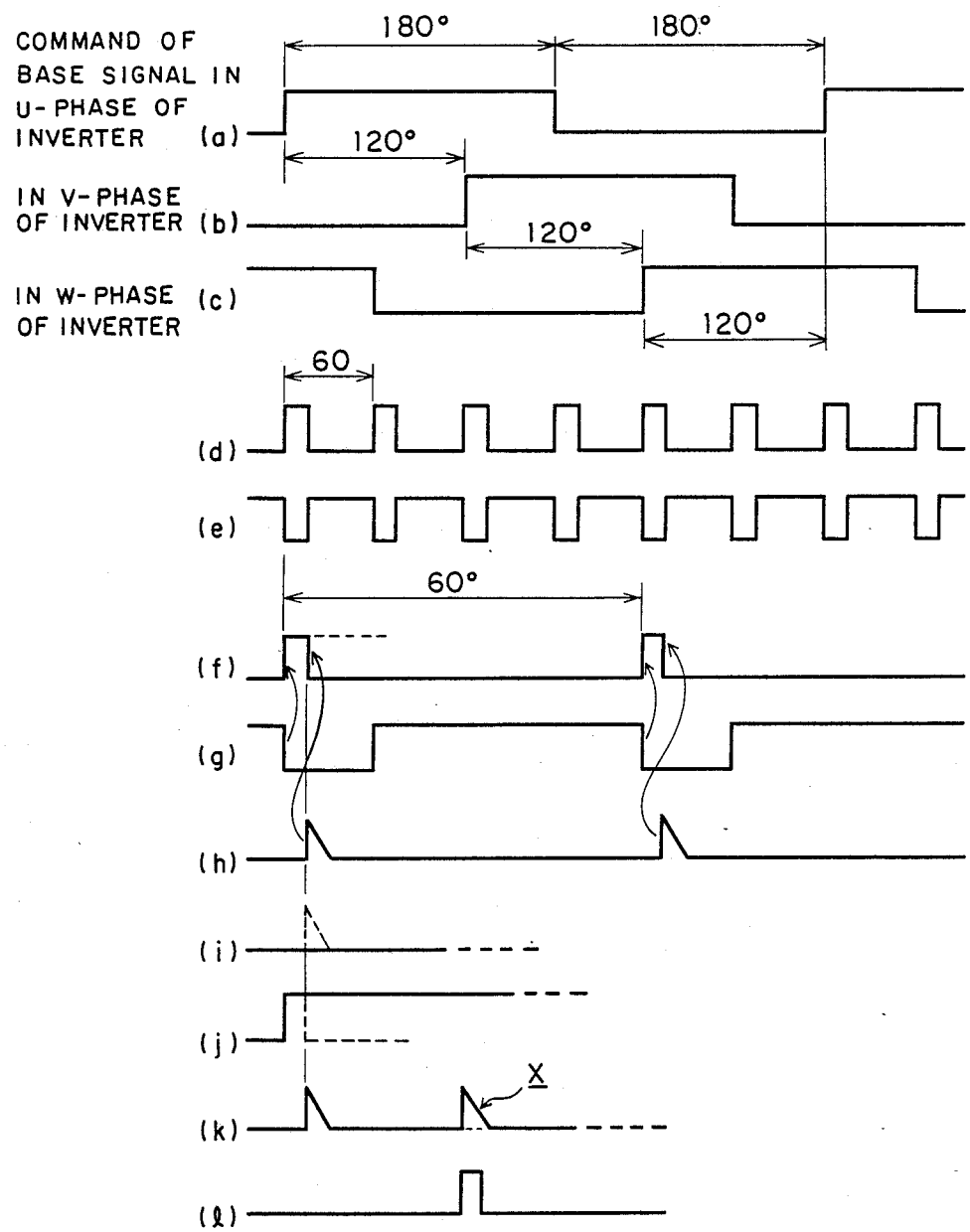
FIG. 4 is a time chart showing an operational state of the main part shown in FIG. 3.

Next, the operation will be described with reference to the time chart showing in FIG. 4.

Each of unit inverter circuits 23U, 23V, and 23W of the three-phase inverter circuit 20 performs commutation in the main circuit by using a command signal for commutation in an inverter having phase difference of 120 degrees with each other shown in FIG. 4(a), (b), and (c). The commutation in the main circuit is carried out by giving a base signal to transistors in the arms 23a on the upper side with a logic input of "1" and to transistors in the arms 23b on the lower side with a logic input of "0" from an element driving circuit not shown, respectively. When commutation occurs in the main circuit, potentials at the centers 24U, 24V, and 24W of the unit inverter circuits 23U, 23V, and 23W at the AC terminal 24 invert from a positive or negative potential of the DC power source 2 to an inverse potential, respectively. A current flows, therefore, in the transformer 28 via the differentiating circuit 26, and a differentiated signal shown in FIG. 4(h) is obtained at the output terminal 42 of the current detecting circuit 27. The differentiated signal is input to an input terminal 41 of the logic circuit for judgement of abnormality of commutation 31. On the other hand, each of command signals for commutation in the inverters shown in FIG. 4(a), (b) and (c) is supplied to each of input terminals, 39a, 39b and 39c of edge detecting circuits 38U, 38V, and 38W, and an edge detecting pulse corresponding to change in the command signal for commutation in the converter and a width of a time limit which inhibits the judgement of abnormality of commutation are obtained. At each of the outputs of the NOR circuit 32 and the NOT circuit 33, each of pulse trains shown in FIGS. 4(d) and (e) is obtained. The waveform shown in FIG. 4(g) is an enlarged one for explaining the time axis of the waveform shown in FIG. 4(e). The output Q of the D flip-flop 34 is synchronized with the command signal for commutation in the inverter by the rising edge of the signal shown in FIG. 4(d) and set to "1" like the waveforms shown in FIGS. 4(f) and (j). If the commutation in the three-phase inverter circuit 20 is carried out normally, the level of the output Q of the D flip-flop 34 is reset to "0", and the signals shown in FIG. 4(f) and (j) are input. Therefore, the output of the AND circuit 36a holds the level of "0". In the case where the three-phase inverter circuit 20 operates abnormally, and normal commutation is not carried out for the command signal for commutation in the inverter, the differentiated signal shown in FIG. 4(h) is not obtained and, therefore, it is in a state shown in FIG. 4(i). Accordingly, since the output of the D flip-flop 34 is not reset but outputs the level of "1" continuously as shown in FIG. 4(j), the output of the AND circuit 36a is made to be "1" and the output 480 of the D. flip-flop 35 is made to be "1" via the OR circuit 37 at the timing when the level of the signal shown in FIG. 4(d) becomes "1", thereby detecting abnormality in the inverter circuit 20. When commutation or abnormality in arc-through occurs at any time except the timing of normal commutation, and a potential of any one of the AC terminals 24U, 24V, and 24W varies, the current detecting circuit 27 detects such a commutating pulse signal as shown by a sign X in FIG. 4(k), makes the output of the AND circuit 36b be "1" as shown by the waveform in FIG. 4(l), and makes the output 48O of the D flip-flop 35 be "1", thereby detecting the abnormality in the inverter circuit 20.

Figure 5:
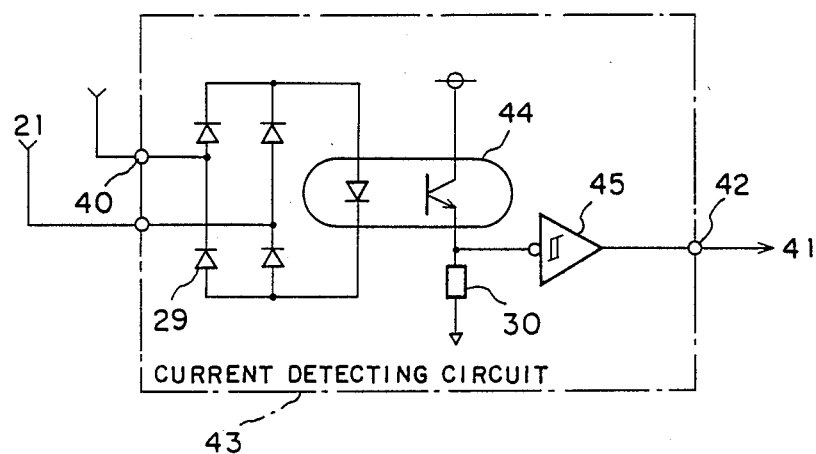
FIG. 5 and FIG. 6 are circuit diagrams of current detecting circuits showing other embodiments according to this invention which realizes current detection without a magnetic circuit.
Figure 6:
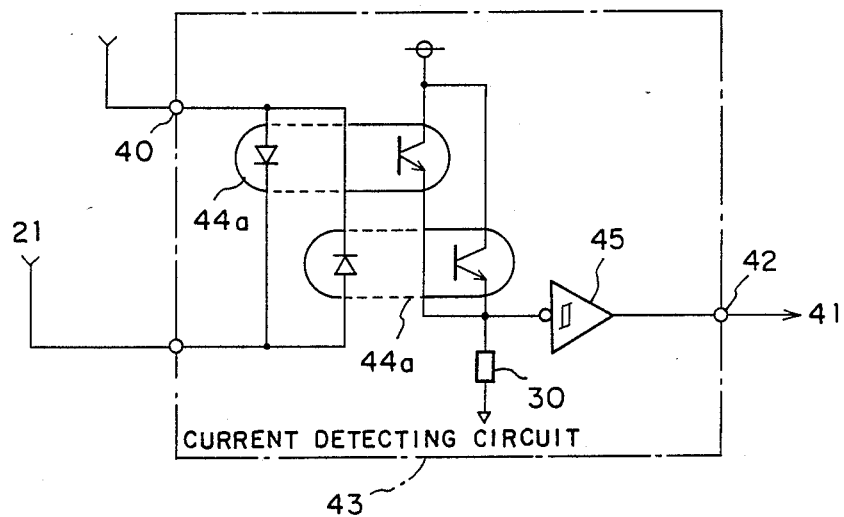

The example in which the transformer 28 is used in the current detecting circuit 27 is explained in the above-mentioned embodiment, but two examples of another current detecting circuit 27 in which a magnetic circuit is not used but a photo-coupler 44 and a buffer circuit 45 are used in order to provide a small size and light weight of the apparatus are shown by a numeral 43 in FIG. 5 and in FIG. 6.

Figure 7:
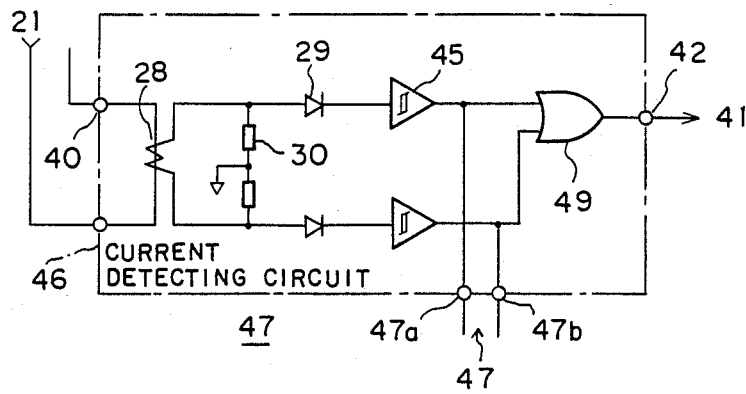
FIG. 7 and FIG. 8 are circuit diagrams of current detecting circuits showing other embodiments according to this invention which provides a detected output of a current detecting circuit with the function of discriminating the direction of detection of a current.
Figure 8:
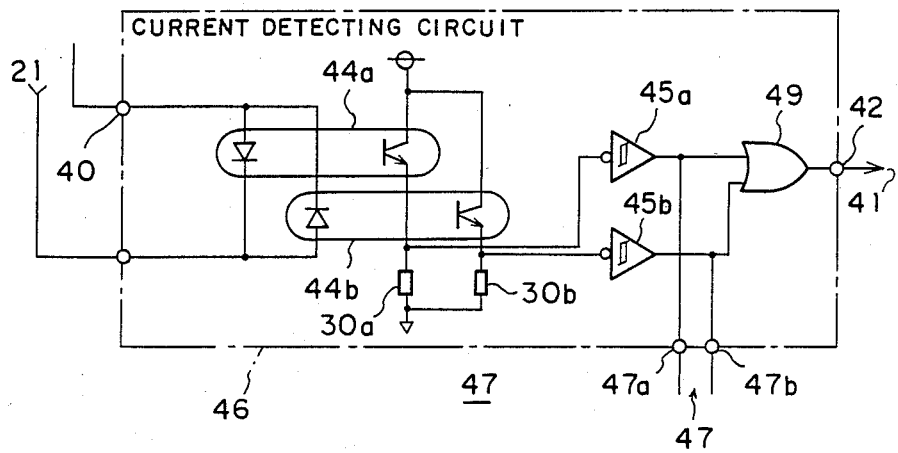

In the examples of FIGS. 5 and 6 the current detecting circuit does not detect the direction of the current is shown in the above-mentioned embodiment, but FIG. 7 and FIG. 8 show examples of another current detecting circuit which allows its detected output 47 to be provided with function of discriminating the direction of the current.

The three-phase transistor inverter circuit 20 is described as an inverter circuit in the above-mentioned embodiment, but even if another system is used as the inverter system, the same effect as the above-mentioned embodiment is obtained.

Also, systems in which a transformer and a photo-coupler are used as the current detecting circuit in the above-mentioned embodiments is shown, but even if another system capable of detecting presence or absence of the differentiated current is used, the same effect as the above-mentioned embodiment can be obtained.

Also, the example in which one end of the current detecting circuit 27 is connected to the center 22 of the balanced capacitor 21 in the above-mentioned embodiment is shown, but even if the end is connected to another point at which the differentiated current due to commutation in the main circuit is obtained, the same effect can be obtained.

As described previously, according to this invention, the detecting apparatus for abnormality in the inverter is able to detect commutation in a plurality of inverter arms with the common current detecting circuit by using the differentiating circuit and the current detecting circuit as the detecting circuit for commutating signals in the inverter, allowing a small size and light weight thereof to be obtained.

Further, regarding to the logic circuit for judgement of abnormality in commutation, a single logic circuit is applied to plural inverter arms for common use; thereby it is possible to improve the economic effect and the reliability at a time by decreasing the number of parts and wirings.

In addition, the influence of delay in operation of switching elements in the main circuit and that of the element driving circuit for the commutation command is avoided by detecting abnormality using agreement or disagreement of the logic within the arbitrary time limit, resulting in the effect that the abnormality can be detected with high accuracy.

What is claimed is:

1. A detecting apparatus for detecting abnormality in an inverter comprising:
   an inverter circuit for inverting power in a DC circuit into that in an AC circuit and vice versa based on a command signal for commutation,
   a detecting circuit for detecting commutation in the inverter circuit, the detecting circuit being comprised of a current detecting circuit provided between a voltage dividing point of said DC circuit and said inverter circuit and provided with its one end connected to said voltage dividing point and a differentiating circuit connected between the other end of the current detecting circuit and an AC terminal of said inverter circuit, and
   a logic circuit for judgement of abnormality in commutation, the logic circuit comparing a detected signal of said detecting circuit for commutation in the main circuit with a command signal for commutation for commanding its commutation to said inverter circuit, and, at the same time, detecting inconsistency in logics of said detecting signal and said command signal for commutation within an arbitrary time period.

2. A detecting apparatus for detecting abnormality in an inverter according to claim 1 wherein said detecting circuit for detecting commutation in the inverter circuit is comprised of a plurality of individual differentiating circuits of which respective one ends are connected to a plurality of AC terminals corresponding to respective unit circuits in said inverter circuit constituted by a plurality of unit circuits and a current detecting circuit of which terminal other than its terminal connected to said voltage dividing point is connected to parallel connected respective other ends of the differentiating circuits, and it is constituted so as to detect commutation phenomena in a plurality of said unit circuits by use of said one current detecting circuit.

3. A detecting apparatus for detecting abnormality in an inverter circuit according to claim 2 wherein said current detecting circuit includes means for detecting the direction of current flow of a detected current.

4. A detecting apparatus for detecting abnormality in an inverter circuit according to claim 1 wherein said current detecting circuit includes means for detecting the direction of current flow of a detected current.

5. A detecting apparatus for detecting abnormality in an inverter circuit according to claim 1 wherein said logic circuit for judgement of abnormality in commutation is supplied with a signal synchronized with an on-off signal supplied to said inverter circuit, and is comprised of,
   an edge detecting circuit for production of a time limit which inhibits judgement of abnormality in commutation in the main circuit by detecting the edge of said synchronized signal,
   a NOR logic circuit for production of a NOR output at the output of the edge detecting circuit,
   a NOT circuit which inverts the output of the NOR logic circuit,
   a first flip-flop circuit which receives as one input thereto the output of the NOT circuit and as another input thereto the output of said differentiating circuit connected through said current detecting circuit and in the form of a reset signal,
   a first AND circuit which receives the output of the first flip-flop circuit and the output of said NOR logic circuit and generates an AND output,
   a second AND circuit which receives the output of said current detecting circuit and the output of said NOR logic circuit and generates an AND output,
   an OR circuit which receives the respective outputs of said first and second AND circuits and generates an OR output, and
   a second flip-flop circuit which receives the output of the OR circuit and outputs a set signal.

6. A detecting apparatus for detecting abnormality in an inverter according to claim 5 wherein said edge detecting circuit includes an exclusive OR circuit which receives said synchronized signal as one input and a divided signal of said synchronized signal via a series connected resistor and a parallelly connected capacitor as the other input.

* * * * *

UNITED STATES PATENT AND TRADEMARK OFFICE
CERTIFICATE OF CORRECTION

PATENT NO. : 4,908,756

DATED : March 13, 1990

INVENTOR(S) : SHIGENORI HIGASHINO

It is certified that error appears in the above-identified patent and that said Letters Patent is hereby corrected as shown below:

Col. 3, line 30, delete "with".

Signed and Sealed this

Sixth Day of August, 1991

Attest:

HARRY F. MANBECK, JR.

*Attesting Officer*      Commissioner of Patents and Trademarks